United States Patent

Young, Jr. et al.

[15] 3,650,799

[45] Mar. 21, 1972

[54] SUBSTRATES PROTECTED WITH PREPARED POLYMERIC ULTRAVIOLET LIGHT STABILIZERS FROM PHENOL-FORMALDEHYDE CONDENSATES

[72] Inventors: Raymond H. Young, Jr., East Longmeadow; Albert H. Markhart, Wilbraham; Joseph G. Martins, Ludlow, all of Mass.

[73] Assignee: Monsanto Company, St. Louis, Mo.

[22] Filed: Aug. 11, 1969

[21] Appl. No.: 849,210

Related U.S. Application Data

[63] Continuation-in-part of Ser. No. 606,595, Jan. 3, 1967, abandoned.

[52] U.S. Cl..........................117/33.3, 117/76 P, 117/124 E, 117/148, 117/155 L, 117/161 L, 260/59, 260/838, 260/847
[51] Int. Cl..........................................................B44d 5/06
[58] Field of Search..................117/33.3, 155 L, 148, 161 L, 117/76 P, 124 E

[56] References Cited

UNITED STATES PATENTS

| | | | |
|---|---|---|---|
| 2,939,856 | 6/1960 | Steckler et al. | 117/161 X |
| 3,330,884 | 7/1967 | Tocker | 117/161 X |
| 3,460,961 | 8/1969 | Young et al. | 117/76 X |
| 3,462,393 | 8/1969 | Legler | 117/124 X |
| 3,492,261 | 1/1970 | Young et al. | 117/161 X |

*Primary Examiner*—William D. Martin
*Assistant Examiner*—Mathew R. P. Perrone, Jr.
*Attorney*—William J. Farrington, Arthur E. Hoffman, Neal E. Willis and Richard W. Sternberg

[57] ABSTRACT

This invention relates to polymeric ultraviolet light stabilizers which are the esterification products of (A) phenol-formaldehyde condensates, which have at least 12.5 mol percent of the positions ortho to the esterifiable hydroxyl group unsubstituted, and (B) a compound capable of esterification with the phenol formaldehyde condensate which contains at least one ring of six carbon atoms characterized by having benzenoid unsaturation. Upon exposure to ultraviolet light, the exposed portion of the ester rearranges to form a polymeric compound which is a barrier to ultraviolet light.

6 Claims, No Drawings

SUBSTRATES PROTECTED WITH PREPARED POLYMERIC ULTRAVIOLET LIGHT STABILIZERS FROM PHENOL-FORMALDEHYDE CONDENSATES

CROSS REFERENCES TO RELATED APPLICATION

This application is a continuation-in-part of copending application Ser. No. 606,595, filed Jan. 3, 1967 and now abandoned.

BACKGROUND OF THE INVENTION

1. Field of the Invention

The present invention relates to polymeric compositions capable of absorbing ultraviolet light and acting as a barrier to ultraviolet light. More particularly, the present invention relates to aromatic compounds which will undergo rearrangement in the presence of ultraviolet light to form a compound which is stable to and will act as a barrier to ultraviolet light.

2. Description of the Prior Art

Ultraviolet light is that portion of the spectrum just beyond violet on the short wave length side, generally from 180–390 $\mu$. Ultraviolet light is emitted by the sun, carbon arc lamps, mercury vapor lamps, tungsten arc lamps and other light sources. The invisible rays from the ultraviolet region induce chemical activity which is both beneficial and adverse. Some of the adverse effects of ultraviolet light are degradation of synthetic resins, such as polyvinyl chloride which is commonly used in exterior structures and articles exposed to sunlight such as sidings, awnings and the like; discoloration of the resinous interlayers used in architectural laminates; fading and deterioration of cellulosic materials such as wood, paper, and the like; fading of black and white and colored photographic prints; fading and discoloration of paints, etc. Indeed, the full list of adverse effects of ultraviolet light is too numerous to be set forth here.

Some aromatic polyester compositions currently available afford some partial degree of protection to ultraviolet light. However, these materials are inadequate by virtue of the fact that they are not opaque to ultraviolet light in the 300–400 $\mu$ region or more likely, they themselves are subject to ultraviolet light degradation.

Other ultraviolet light stable aromatic polyesters such as described in U.S. Pat. No. 3,234,167 are relatively stable to ultraviolet light. However, these polymers do not necessarily act as ultraviolet light barriers which would serve to protect other less stable materials intimately associated with the ultraviolet light stabilizers.

Monomeric type ultraviolet light stabilizers, while providing a certain degree of protection from the adverse effects of ultraviolet light, exhibit serious drawbacks which preclude their widespread use. Examples of these drawbacks include non-film forming properties, stabilizer migration, stabilizer extraction, poor mechanical stability, etc.

A definite need exists for polymeric ultraviolet light stabilizers with little or no tendency to migrate or be extracted and which will provide excellent protection from and act as a barrier to ultraviolet light.

SUMMARY OF THE INVENTION

The present invention is directed to aromatic polymeric ultraviolet light stabilizers which are the esterification reaction product of (A) a phenol formaldehyde condensate, having at least 12.5 mol % of the positions ortho to the esterifiable hydroxyl groups unsubstituted, and (B) a compound capable of esterification with the hydroxyl groups on the phenol formaldehyde condensate, which compound contains at least one ring of six carbon atoms characterized by having benzenoid unsaturation. Upon exposure to ultraviolet light the exposed portion of the polymer rearranges to form a polymeric ultraviolet light stabilizer which is also a barrier to ultraviolet light. The unexposed portions of the polymer do not rearrange and are available for rearrangement at a later time when they are exposed to ultraviolet light.

The present invention solves problems previously existent in the prior art by providing a polymeric material which affords an excellent barrier to ultraviolet light. Moreover, this material has little or no tendency to migrate or to be extracted.

The preparation of the polymeric ultraviolet light stabilizers of this invention and their subsequent rearrangement may be represented by the following general formulas

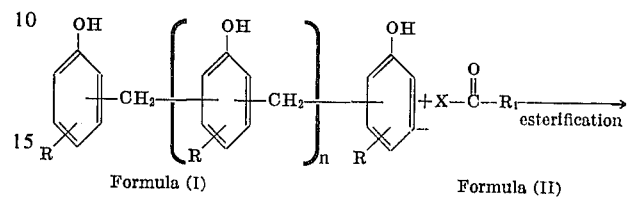

Formula (I)     Formula (II)

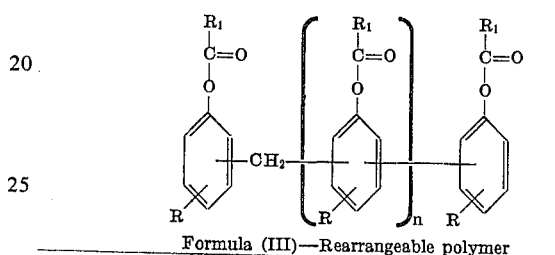

Formula (III)—Rearrangeable polymer

Upon exposure to ultraviolet light the exposed portions of the rearrangeable ester shown in Formula III above will rearrange to form a material which may be represented by the following general structure:

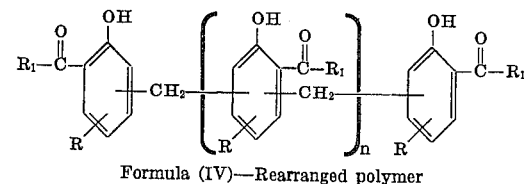

Formula (IV)—Rearranged polymer

It is this latter structure which possesses the ultraviolet light barrier properties which characterize the novel polymers of this invention.

Thus, after exposure to UV light, films of the polymeric materials comprise two superposed contiguous layers. The outer exposed layer, which is the rearranged polymer, has a structure corresponding to that shown in Formula IV above. The inner unexposed layer, which is the rearrangeable polymer, has a structure corresponding to that shown in Formula III above. Thus, the ultraviolet light exposed polymers of the present invention are copolymeric in nature, wherein the rearrangeable esters (Formula III) form one repeating unit while the ultraviolet light rearranged polymer (Formula IV) is the other repeating unit.

DESCRIPTION OF THE PREFERRED EMBODIMENTS

The polymeric backbones used in the preparation of the polymeric ultraviolet light stabilizers of this invention are phenol formaldehyde condensates of the novolac or resole type. These may be generally represented by the following structural formula:

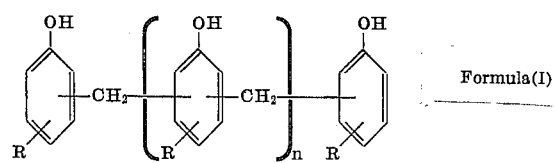

Formula (I)

wherein R is selected from the group consisting of hydrogen, halogen and an aliphatic radical of from one to five carbon atoms and wherein $n$ is an integer of from one to 25 The R groups may be in the meta or para position so long as there are at least 12.5 mol % of the positions ortho to the esterifiable hydroxyl groups available, i.e., unsubstituted. Preferably, $n$ is an integer of from two to 20 and more preferably an integer of from two to 10.

It should also be noted that the compounds represented by Formula (I) may also contain methylol end groups. However, the preferred end groups are phenol. The preparation of this type reactant is notoriously well known in the art and needs no further discussion here. The nature of this invention requires that the structure represented by Formula (III) must have at least 12.5 mol % of the positions ortho to the esterified hydroxyl group available, i.e., unsubstituted in order for the rearrangement to take place. Preferably, there should be 16⅔ mol % and more preferably 20 mol % of available ortho positions. When there are less than 12.5 mol % available ortho positions, there will be limited or no rearrangement of the esterification product (Formula III) to form the ultraviolet light absorbing compounds represented by Formula (IV). In such a case, where there are from 1.85 to less than 12.5 mol % of positions ortho to the hydroxyl group available, undesirably large amounts of the compounds re by Formula (IV) are required to provide the necessary level of ultraviolet light stability.

The polymeric ultraviolet light stabilizers of this invention are prepared by esterifying the hydroxyl groups in Formula (I) with a compound which corresponds to the following general formula:

Formula (II)

wherein $R_1$ is a monovalent radical containing at least one ring of six carbon atoms, said ring characterized by benzenoid unsaturation wherein the benzenoid ring is attached directly to the carbonyl group; and wherein X is selected from the group consisting of halogen, hydroxyl, ester groups characterized by the structure $R_2O$; and anhydride groups characterized by the structure

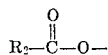

wherein $R_2$ is selected from the group consisting of aliphatic radicals of from one to five carbon atoms and aromatic radicals of from six to eight carbon atoms.

The nature of the X constituent in Formula (II) is such that it must be capable of esterification with the hydroxyl groups in Formula (I). This may be conveniently carried out by the straight forward esterification reaction of the hydroxyl groups with an acid halide, free acid or acid anhydride group. An alternate method which may be used, when X is an alkoxy group such as $R_2 - O -$, is the well known transesterification technique. The preferred X group is halogen.

An essential requirement for the $R_1$ group in Formula (II) is that it contains at least one ring of six carbon atoms characterized by benzenoid unsaturation which is connected directed to the

portion of the structure. This requirement is necessary if rearrangement is to take place in the final polymeric product when this material is exposed to ultraviolet light.

The remaining characteristics of the R group are relatively unimportant as this group does not directly participate in either the esterification reaction or the subsequent rearrangement and wide variations in the $R_1$ group are possible. Examples of the possible variations in the suitable $R_1$ groups are listed below.

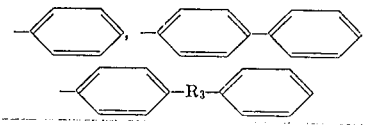

wherein $R_3$ is a divalent radical selected from the group consisting of aliphatic radicals of from one to four carbon atoms, oxygen, sulfur, sulfonyl, phosphonyl and silanes such as — $Si(R_4)_2$— wherein $R_4$ is an aliphatic radical of from one to four carbon atoms.

It should be noted further that the examples of suitable $R_1$ groups set forth above may also contain ring substituents in the ortho, meta and para positions. Examples of these ring substituents would include aliphatic radicals and alkoxy radicals wherein the aliphatic and alkyl groups contain from one to four carbon atoms, halogen, nitro, dimethyl amino, sulfone amide, a sulfonyl chloride, etc.

It should be noted that it is not necessary to esterify all of the hydroxyl groups in the phenol formaldehyde condensates (Formula (I) in order to prepare polymers with good ultraviolet light barrier properties. The concept of this invention contemplates having a rearrangeable polymer (Formula III) which contains from 0 to 20 percent and more preferably 0–15 percent residual hydroxyl groups. It should be noted that any unesterified phenol, hydroxy groups or methylol end groups may also serve as cross-linking sites if a cross-linked structure is desired.

The relative amounts of reactants as represented for formulas (I) and (II) that will be required to produce a given polymer will depend upon the particular systems used and the desired degree of residual hydroxyl groups in the rearrangeable polymer (Formula III). This concept of controlling the amount of reactants in order to control the final polymeric composition is well known to those skilled in the art and will be further illustrated in the working examples.

The following examples are set forth to further illustrate reactants which are represented by Formula (II) above and are contemplated for use in the practice of this invention.

Acid halides such as benzoyl chloride, benzoyl bromide, p-methoxy-benzoyl chloride, p-chlorobenzoyl chloride, m-nitrobenzoyl chloride, p-amino-sulfonyl benzoyl chloride, 3,5-dibromobenzoyl chloride, 4-chlorocarbonyl bi-phenyl, 4-chlorocarbonyl diphenyl ether, p-(phenyldimethyl silyl)benzoyl chloride, 3,4-methylenedioxy benzoyl chloride, p-(methylthio)benzoyl chloride, etc. Free acids such as benzoic acid, p-methoxy benzoic, p-toluic acid, p-(4-phenyl-n-butyl)benzoic acid, p-phenyl benzoic acid, p-aminosulfonyl benzoic acid, as well as the free acids of the foregoing acid halides.

Acid anhydrides such as p-nitro benzoic anhydride, p-chloro benzoic anhydride, benzoic acetic mixed anhydride, benzoic trifluoroacetic mixed anhydride, etc.

Esters which are capable of undergoing a transesterification reaction such as methyl p-dimethylamino benzoate, methyl 3,5-dimethyl benzoate, phenyl benzoate, phenyl p-benzoyl benzoate, phenyl p-dimethylamino benzoate, etc. The esters prepared from aromatic type alcohols are preferred.

The following examples are set forth in illustration of this invention and should not be construed as being limitations thereof. All parts and percentages are by weight unless otherwise indicated.

PART I

PREPARATION OF THE POLYMERIC ULTRAVIOLET LIGHT STABILIZERS

EXAMPLE 1

This example illustrates the use of a solution process to prepare a polymeric ultraviolet light stabilizer. The reaction is carried out in a 1 liter resin flask equipped with a stirrer, condenser, thermometer and dropping funnel using the following materials.

| Charge A | Charge B |
|---|---|
| 100 g. Phenolic Novolac | 100 g. |
| 135 g. Benzoyl Chloride | Triethylamine |
| 500 ml. Tetrahydrofuran | |

Charge A is placed in the flask and is cooled to 8° C. with an ice-water bath. The phenolic novolac resin used is a phenol formaldehyde condensate of the type represented by Formula I having approximately 50 mol % available ortho positions and wherein R is hydrogen and $n$ is eight. Charge B is then added over a 45-minute period from the dropping funnel. A precipitate of triethyl-amine hydrochloride forms within 2 minutes indicating that the esterification reaction is taking place. When the addition is complete, the ice-water bath is removed and the reaction mixture is allowed to warm to room temperature. Stirring is continued for 3 hours followed by filtration of the slurry. The clear filtrate is disintegrated in water and the ester filtered. The resin is washed with water twice and once with methanol and then once again with water. The product is air-dried at room temperature.

Yield of the nearly white solid is 189 g. which is 95 percent of the theoretical yield. An additional 3–6 g. is isolated from the triethylamine hydrochloride which is removed before disintegration. Analysis of the resin indicates less than 5 percent residual hydroxy groups indicating almost complete esterification.

EXAMPLE 2

This example is set forth to illustrate one of the many possible variations that may be made in the nature of the $R_1$ group in Formula (II).

Example 1 is repeated here except that 164 grams of p-methoxybenzoyl chloride is used in place of the benzoyl chloride used in Example 1. The polymeric product which is recovered in a yield of about 94 percent of theoretical, contains less than 5 percent residual hydroxy groups, and is comparable to the product obtained in Example 1.

EXAMPLE 3

This example illustrates the preparation of the polymeric ultraviolet light stabilizers of this invention using an interfacial polymerization process.

The reaction is carried out in a 1 liter resin flask equipped with a paddle stirrer, gas inlet condenser, thermometer and dropping funnel using the following materials:

| Charge A | Charge B |
|---|---|
| 54 g. Phenolic Novolac | 80 g. Benzoyl Chloride |
| 22.8 g. Sodium Hydroxide | |
| 300 ml. Water | |
| 3 g. Duponol ME Surfactant | |

Charge A is placed in the flask and cooled with an ice-water bath to 10° C. The phenolic novolac resin used is a phenol formaldehyde condensate of the type represented by Formula (I) having 60 percent available ortho positions wherein R is hydrogen and $n$ is about four. Nitrogen is bubbled through the solution for 10 minutes and then Charge B is added to the rapidly stirred solution over a period of 20 minutes. Within 4 minutes the esterified product begins to precipitate. When the addition is complete, the color of the solid precipitate is light yellow and the mixture is basic to pH paper. However, an additional 15 minutes of stirring completes the reaction and the mixture becomes neutral to pH paper. The resin is filtered and washed twice with water, once with methanol, and finally once again with water. The slightly tan resin is air-dried at room temperature.

The yield of resin is 91 g. (86 percent of theory). Analysis shows a residual hydroxy content of 13 percent.

EXAMPLE 4

This example is set forth to illustrate a method for lowering the residual hydroxyl content of the polymeric product. Example 3 is repeated here except that 100 grams of benzoyl chloride is used instead of the 80 gram quantity used in Example 3. The resultant polymeric product, recovered in a yield which is 93 percent of theoretical, has a residual hydroxyl content of about 2 percent.

EXAMPLE 5

This example is set forth to illustrate another of the many possible variations that may be made in the nature of the $R_1$ group in Formula (II).

Example 3 is repeated here except that 144 grams of para nitrobenzoyl chloride dissolved in 300 ml. methylene chloride is used in place of the benzoyl chloride used in Example 3. The polymeric product, which is recovered by disintegration in methanol in a yield of about 94 percent of theoretical, contains less than 5 percent residual hydroxy groups, and is comparable to the product obtained in Example 1.

EXAMPLE 6

This example is set forth to illustrate a variation in the solution esterification technique using an inorganic acid acceptor in place of the triethylamine acceptor used in Example 1. The following ingredients are charged to the same apparatus used in Example 1:

Charge
100 g. Phenolic Novolac
185 g. m-nitro benzoyl chloride
400 ml. Acetone
145 g. Potassium Carbonate (anhydrous)

The phenolic novolac resin used is a phenol formaldehyde condensate of the type represented by Formula (I) having 35 mol % available ortho positions and wherein R is hydrogen and $n$ is three.

The charge is heated at reflux for 3 hours. At the end of the 3-hour period, the thick slurry is disintegrated with water. The resin is filtered, washed twice with hot water (60°–70° C.), once with methanol, and finally once again with water. The resin is air-dried at room temperature.

The yield of white solid is 238 g. (98 percent of theory) and has a residual hydroxyl content of 0 percent indicating complete esterification.

EXAMPLE 7

This example is set forth to illustrate the use of a compound represented by the general Formula II wherein X represents an anhydride structure.

The esterification reaction is carried out using a 500 ml. resin flask equipped with a stirrer, condenser and thermometer. 10.0 Grams of the phenol-formaldehyde condensate used in Example 1 is added to 100 ml. of anhydrous pyridine in the flask while maintaining continuous agitation. The flask is cooled with a water bath maintained at room temperature (25°–27° C.) 28.6 grams of para-chlorobenzoic anhydride is added to the flask over a 15 minute period. The initially dark solution of reactants becomes virtually colorless after 1 hour of mild agitation. The reaction mixture is then poured into 2 liters of water in a high shear blender while maintaining vigorous agitation. Solid sodium bicarbonate is added to the blender until the aqueous phase becomes slightly basic at which time the aqueous phase is decanted and the solid resin is washed with water, methanol and then again with warm water (60°–70° C.). The white resin which has a residual hydroxyl content of 6.2% is dried overnight at 50° C. in a circulating air oven, to yield 21.8 grams of polymeric product.

EXAMPLE 8

This example is set forth to illustrate the preparation of the novel polymeric ultraviolet light stabilizers of this invention using a reactant which corresponds to the general structure of Formula II wherein X is a hydroxyl group.

The esterification reaction is carried out in the apparatus used in Example 3 wherein 10.5 grams of the phenol formaldehyde condensate used in Example 6 is reacted with 19.8 grams of para phenyl benzoic acid. The reactants are charged to the flask and a nitrogen purge is maintained for 15 minutes after which time 162 grams of polyphosphate ester [prepared in chloroform according to Y, Kanaoka et al., Chem. Pharm. Bull (Tokyo) 12, 773 (1964)] is added to the flask and the mixture is heated at reflux for 30 minutes and then stirred at room temperature for 15 hours. The polymeric precipitate formed is washed alternately with water and methanol. The slightly yellow resin which has a residual hydroxyl content of 17.6 percent was obtained in a 71 percent yield.

EXAMPLE 9

The following example is set forth to illustrate the use of a compound corresponding to the general structural Formula II wherein X is an ester group and also to illustrate the transesterification reaction used in the preparation of the polymeric ultraviolet light stabilizers of this invention. Into the apparatus described in Example 7 is charged 25.4 grams of phenyl p-benzoyl benzoate and 10.5 grams of the phenol formaldehyde condensate used in Example 1. The solid reactants are heated to about 70° C. before liquification takes place, at which time 1 gram of magnesium metal is added. The reaction mixture is heated for 6 hours during which time the phenol formed from transesterification is distilled off over a temperature range of from 100° to 150° C. under 1.5 mm pressure. The solid residue in the flask is triturated with acetone and poured into water. The tan polymeric product which contains about 10 percent residual hydroxyl groups is washed three times with water and twice with methanol. Yield is 18.8 grams.

EXAMPLE 10

The following example is set forth to illustrate the preparation of a polymer having only 11.1 mol % available ortho positions and the subsequent inefficiency of this polymer as an ultraviolet light stabilizer. The phenol formaldehyde condensate used has no terminal methylol groups and is prepared exclusively from para-cresol wherein the formaldehyde condensation reaction is directed to the ortho positions. The resulting condensate has 11.1 mol % of ortho positions available and corresponds to the general structural Formula I wherein R is methyl and $n$ is seven. 11.8 Grams of this material is reacted with 14 grams of benzoyl chloride according to the procedure followed in Example 6. The resulting polymer was found to contain about 7 percent residual hydroxyl groups. As will be illustrated in the test below, the insufficient number of available ortho positions limit the ability of this compound to rearrange to form suitable ultraviolet light barriers of the type represented by Formula (IV).

EXAMPLE 11

Example 10 is repeated except that the degree of condensation of the phenol formaldehyde resin is regulated so that $n=6$ to give a condensate with 12.5 mol % of available ortho positions. The tests below will illustrate the improved efficiency of the ultraviolet light barrier properties of the rearranged form of this compound when compared to that prepared in Example 10.

EXAMPLE 12

Example 10 is repeated except that the degree of condensation of the phenol formaldehyde resin is regulated so that $n=4$ to give a condensate with only 16⅔ mol % of available ortho positions. The tests below will illustrate the improved efficiency of the ultraviolet light barrier properties of the rearranged form of this compound when compared to that prepared in Example 10.

EXAMPLE 13

This example is set forth to illustrate the need to have a Formula II type reactant wherein the benzenoid ring is connected directly to the carbonyl group.

Example 1 is repeated here except that 160 grams of cinnamoyl chloride are used in place of the benzoyl chloride used in Example 1. The esterification reaction proceeds to completion to give a polymer which is comparable to that obtained in Example 1 (yield 94 percent; residual hydroxy groups 7.2 percent). The tests described below will illustrate the inability of this material to act as an ultraviolet light stabilizer, which inability is presumed to be due to the unsaturated vinyl structure which is interposed between the carbonyl group and the benzenoid ring.

The following examples, set forth in tabular form, further illustrates some of the possible variation in the nature of the reactants that may be used in the practice of this invention. The solution procedure of Example 1 is followed here, the weight ratio of the respective structures Formula II/Formula I was varied from a 0.5 to 2.0/1. In each instance a rearrangeable polymeric ultraviolet light stabilizer was obtained.

TABLE ONE

| | Formula I type reactant | | Formula II type reactant | |
|---|---|---|---|---|
| Ex. | R group | Value of n | X group | R₁ group |
| 14 | Methyl | 4 | Chlorine | phenyl with CH₃ |
| 15 | Chlorine | 6 | do | phenyl–Cl |
| 16 | Hydrogen | 3 | do | biphenyl |
| 17 | do | 21 | Hydroxyl | phenyl |
| 18 | | 4 | Chlorine | phenyl–O–phenyl |
| 19 | Nitro | 1 | do | phenyl |
| 20 | Hydrogen | 3 | Bromine | phenyl–S(O)(O)– |

The esterification techniques set forth in the foregoing examples are generally well known to those skilled in the art and need no further explanation here.

PART II

REARRANGEMENT AND TESTING OF THE POLYMERIC ULTRAVIOLET LIGHT STABILIZER

The rearrangeable polymeric compounds represented by Formula (III) and prepared in Part I are tested further here in order to illustrate the ability of that portion of the polymer which is exposed to ultraviolet light to rearrange to a structure represented by Formula (IV). It is these rearranged structures which provide the barriers to ultraviolet light.

In the following tests, the rearrangeable polymeric materials prepared in Examples 1–13 are incorporated into a poly(vinyl butyral) resin by dissolving the resin and the rearrangeable polymeric materials in a suitable solvent. About one part of rearrangeable ester is used per hundred parts of resin (phr). The solution is then cast and the solvent evaporated to form films about 0.4 mil thick. The films are then exposed to ultraviolet light according to the procedure outlined below.

The ultraviolet lamp used for irradiation is a Hanovia 450-watt hight pressure quartz mercury-vapor lamp, model 679A with a reflector, which is positioned about 25 cm. from the sample. The approximate intensity of all ultraviolet light radiation (200–400 $\mu$) reaching the sample is approximately $1.1 \times 10^4$ microwatts/cm². The total output of ultraviolet radiation from the lamp is 83.7 watts which represented 47.5 percent of the total radiation emitted, the remaining 52.5 percent consisting of visible and infrared radiation. For the sake of comparison it should be noted that the intensity of the ultraviolet light radiation of sunlight is only about 10–300 microwatts/cm²

Spectra of the films are obtained using a Beckman DK-2 Spectrophotometer over the wavelength range of approximately 500 to 240 millimicrons. The rearrangeable esters represented by Formula III initially are transparent to ultraviolet light in the 300–400 $\mu$ range; whereas, the rearranged hydroxybenzophenone structures represented by Formula (IV) have a strong absorption band at about 350 μ. Thus, the increase in absorption along with the formation of the band at about 345 millimicrons upon exposure to ultraviolet light corresponds to the formation of characteristic σ-hydroxybenzophenone groups. These groups are formed as the esters (Formula III) rearrange to the structure represented in Formula IV.

The poly(vinyl butyral) does not absorb ultraviolet light in the 300–400 μ wave length range used in the test. Thus, all absorption of the ultraviolet light rays is due to the polymeric ultraviolet light stabilizers prepared in Part I above.

The time required for the esters represented by Formula III to rearrange into σ-hydroxybenzophenone structures represented by Formula IV and become effective stabilizers is dependent on such variables as the intensity of ultraviolet light incident on the sample, the concentration of the rearrangeable ester in the polymer and the type of polymer the substituents present in the acid portion, and the number of available ortho positions. Table 1 gives the times necessary, under the conditions stated above, to obtain approximately 50 percent rearrangement.

prepared in Part I above are dissolved in a solvent. The resulting solution contains from about 0.5 to 1.0 parts of rearrangeable polymer per hundred parts of resin.

Films of varying thicknesses are cast on glass panes and then air dried to give clear, colorless, transparent films. The films are then irradiated with ultraviolet light according to the procedures set forth above, for given periods of time. The spectra of the film are then obtained on a Beckman DK–2 Spectrophotometer over the wavelength range of approximately 500 μ – 240 μ. In some cases spectra are obtained using no reference and some using an unirradiated film as a reference.

Within one minute of irradiation by the 450 watt ultraviolet lamp a noticeable increase in absorption occurs around 345 μ and around 265 μ when unirradiated film is used in reference holder. However, as the irradiation continued, the amount of increase in absorption at these wavelengths became progressively smaller and eventually no significant increase is observed. The following tables show this effect.

TABLE TWO.—IRRADIATION TESTS ON POLY(VINYL BUTYRAL) CONTAINING POLYMERIC ULTRAVIOLET LIGHT STABILIZERS

| Polymeric stabilizer used [1] | Approx. time (minutes) for 50% rearrangement at λ maximum | Percent ultraviolet light absorption [2] | Time (hours) to degradation of the film [3] |
|---|---|---|---|
| Control (no stabilizer added) | | Zero | 18 disintegration. |
| Example 1 | 14 | 78 | 60 no change. |
| Example 2 | 11 | 65 | 60 no change. |
| Example 3 | 13 | 77 | 60 no change. |
| Example 4 | 11 | 79 | 60 no change. |
| Example 5 | 36 | 85 | 60 no change. |
| Example 6 | 18 | 78 | 60 slight crazing. |
| Example 7 | 16 | 77 | 60 slight crazing. |
| Example 8 | 15 | 78 | 60 no change. |
| Example 9 | 19 | 77 | 60 no change. |
| Example 10 | 29 | 47 | 18 brittle film. |
| Example 11 | 21 | 63 | 36 brittle film. |
| Example 12 | | | 48 slightly brittle film. |
| Example 13 | (4) | Zero | 21 disintegration. |

[1] Example numbers refer to the polymeric stabilizer prepared in the foregoing working examples.
[2] This value indicates the percentage of ultraviolet light absorbed at maximum absorption.
[3] In Examples 2–9, the tests were discontinued after 60 hours.
[4] No absorption.

The superior results obtained when using the polymeric ultraviolet light stabilizers of Examples 1–9 and 11–12 illustrates the excellent ultraviolet light barrier properties imparted by the polymeric stabilizers prepared in accordance with the teachings of this invention. The relatively poorer ultraviolet light stability observed when using the stabilizer prepared in Example 10 illustrates the need for having at least 12.5 mol % available ortho positions in order to allow sufficient rearrangement to take place to form the necessary ultraviolet light stabilizing structure (Formula II). Example 13 illustrates the need to have the benzenoid ring attached to the carbonyl group in the Formula II type reactants.

A comparison of the results obtained when using the polymeric stabilizers of Examples 10 to 12 illustrates that some degree of protection is obtained when using materials that have as little as 11.1 mol % available ortho positions. However, the amount of protection obtained falls off rapidly as the number of available ortho positions approaches zero. Note that the stabilizer prepared in Example 11 having 12.5 mol % of available ortho positions gives about 72 percent more exposure time than the stabilizer of Example 10, whereas the stabilizer of Example 12 having 16⅔ mol % of available ortho positions gives significantly better protection for longer exposure times.

The following data are presented to illustrate the effect of ultraviolet light exposure times on the ultraviolet light % transmission of the irradiated sample. In these examples polyvinyl butyral of the type used above and a rearrangeable polymer

TABLE THREE

UV Irradiation of the Rearrangeable Polymer Prepared in Example 1 and Resulting % Transmission of UV Light

| Time (Minutes) (1) | Film Thickness (2) | | |
|---|---|---|---|
| | 0.6 mil % T (3) | 0.9 mil % T | 1.3 mil % T |
| 0 | 100 | 99.4 | 98.4 |
| 1 | 97.5 | 96.2 | 95.3 |
| 2 | 97.0 | 94.4 | 91.8 |
| 5 | 96.5 | 91.0 | 85.8 |
| 10 | 93.5 | 88.0 | 81.0 |
| 20 | 92.5 | 84.8 | 76.7 |
| 50 | 92.0 | 82.0 | 72.3 |
| 100 | 92.0 | 81.8 | 71.0 |

(1) Exposure time of films to ultraviolet light source.
(2) Concentration of rearrangeable polymer is 0.5 parts per hundred parts of resin.
(3) % T = % Transmission at λmaximum = 345 millimicrons (mμ).

Note the decreasing amount of % T with increasing UV irradiation time and increasing film thickness.

In the following Table Four the data given are for a 0.3 mil film of polyvinylbutyral which contains 1.0 parts per hundred parts of polyvinylbutyral of the rearrangeable polymer prepared in Example 3 above. In this series an unirradiated film is used as a reference which gives rise to the band at 265 μ. Note the decreasing amount of % T with increasing UV irradiation time which is comparable to that reported in Table One.

TABLE FOUR

UV Irradiation of the Rearrangeable Polymer Prepared in Example 1 and Resulting % Transmission of UV Light Using an Unirradiated Reference

| Time (minutes) | % T 345 μ (1) | % T 265 μ (2) |
|---|---|---|
| 0 | 100.0 | 100.0 |
| 1 | 92.5 | 81.0 |
| 2 | 87.0 | 70.0 |
| 3 | 82.5 | 62.6 |
| 4 | 78.5 | 56.7 |
| 5 | 76.0 | 52.0 |
| 10 | 66.0 | 38.5 |
| 15 | 60.0 | 31.5 |
| 20 | 56.5 | 27.1 |
| 60 | 44.0 | 16.7 |
| 75 | 41.7 | 14.8 |
| 90 | 40.0 | 13.5 |
| 105 | 38.8 | 12.8 |
| 120 | 38.7 | 11.8 |

1. % transmission at λ maximum — 345 millimicrons.

2. % transmission at λ maximum = 265 millimicrons.

The experiment reported in Table Four is repeated in the following Table Five except that no reference film is used. The following values are obtained.

TABLE FIVE

UV Irradiation of the Rearrangeable Polymer Prepared in Example 1 and Resulting % Transmission of UV Light

| Time (minutes) | % T 345 μ |
|---|---|
| 0 | 100 |
| 5 | 87.8 |
| 35 | 72.5 |
| 60 | 66.5 |
| 120 | 64.7 |
| 480 | 56.8 |
| 1800 | 58.7 |

Note that after the sample had been irradiated for 480 minutes only a very slight change in percent transmission occurs upon further irradiation of the film.

In the following Tables Six and Seven, the data presented is ultraviolet light irradiation exposure times and the resulting ultraviolet light percent transmission for the rearrangeable polymers prepared in Examples 2 and 5 above. The experimental procedures used are the same as those used in obtaining the data in Tables Three and Four. In each Table the irradiated sample was a 0.3 mil film of polyvinylbutyral which contains 1.0 parts of rearrangeable polymer per hundred parts of polyvinylbutyral.

TABLE SIX

UV Irradiation of the Rearrangeable Polymer Prepared in Example 11 and Resulting % Transmission of UV Light

| Time (Minutes) | % T (1) |
|---|---|
| 0 | 100 |
| 5 | 79.1 |
| 10 | 74.9 |
| 20 | 64.8 |
| 60 | 54.7 |
| 120 | 52.8 |
| 390 | 52.3 |
| 1710 | 54.3 |

1. % transmission at λ maximum — 340 millimicrons.

TABLE SEVEN

UV Irradiation of the Rearrangeable Polymer Prepared in Example 5 and Resulting % Transmission of UV Light

| Time (Minutes) | % T (1) |
|---|---|
| 0 | 100 |
| 5 | 95.7 |
| 35 | 71.3 |
| 60 | 65.0 |
| 120 | 59.5 |
| 480 | 51.7 |
| 1800 | 50.2 |

(1) % transmission at maximum = 348 millimicrons.

The slight shift in the wavelength for λ maximum in Tables Six and Seven is believed to be due to the substituent para-methoxybenzoate and para nitro groups found in these polymers. As in Table Three and Four above, increasing times of ultraviolet light irradiation results in decreased ultraviolet light transmission. This indicates that as the irradiated portion of the polymer rearranges the rearranged portion acts as a barrier to ultraviolet light protecting the unexposed portion. Thus, the unexposed portion is still in the unrearranged form.

The above Tables show the effect of increased irradiation on polyvinyl butyral films containing the rearrangeable polymers of the present invention; namely, the leveling of the % T in each case.

The absorption of light by molecules is dependent on the number of absorbing species present in the light path. This number can be altered either by varying the concentration of the absorbing molecules or by varying the thickness of the absorbing sample. These are combined into one expression called Beer-Lambert Law which is expressed as follows:

$\log(I_o/I) = E\,C\,L =$ (constant) (concentration) (cell length)

The term $\log(I_o/I) = \log(1/T)$ is called the absorbance $A$, thus $A = E\,C\,L.$ A consideration of this law will enable those skilled in the art to calculate the amount of rearranged polymer that is present in the ultraviolet light irradiated polymers of this invention. In the above expression E is called the extinction coefficient and may have any units desired. Usually, when working with monomeric compounds of known molecular weight, the concentration is given in moles per liter and the thickness in centimeters which leads to E being called the molar extinction coefficient. When the molecular weight of a polymeric sample is unknown, the concentration is given usually in terms of grams/liter or some other appropriate number. A useful value for E when working with unknown compounds is to use the term K value which is defined as that amount of material (in grams) dissolved in a liter of solution which reduces the incident light to 10% of its original value. Therefore, since T = 10%, T = 0.10 and 1/T = 10; and log (1/T) = 1; thus the K value can be expressed K =1/CL. When calculating the percent rearrangement the quantities C and L are then given in terms of grams/liter (g/l) and centimeters (cm.). If we assume the polyvinyl butyral to have a density of 1.0, the concentration of the unrearranged polymer becomes 5–10 g./l., and the film thickness is converted to centimeters.

The K value for the films given in the above Tables, are calculated at a time when the rearrangement is essentially unaffected by further irradiation. The theoretical K values for the polymers of the present invention is taken at 54.5. This K value is determined by applying the principles of the Beer- Lambert law to the percent Transmission value observed in Table Four above after the sample is irradiated for 120 minutes. The above K value correlates well with the K values reported in the literature for the monomeric analogs.

TABLE EIGHT

Calculation of % Rearrangement Which Occurs in Ultraviolet Light Irradiated Polymer Samples

| SAMPLE No. 1) | Time (2) | Concentration (3) | Thickness (4) | % T (5) | % Rearranged (6) |
|---|---|---|---|---|---|
| Table Three | 100 | 0.5 | 0.6 | 92.0 | 8 |
|  | 100 | 0.5 | 0.9 | 81.8 | 14 |
|  | 100 | 0.5 | 1.3 | 71.0 | 17 |
| Table Four | 120 | 1.0 | 0.3 | 38.7 | 100 |
| Table Five | 480 | 1.0 | 1.0 | 56.8 | 18 |
| Table Six | 390 | 1.0 | 1.0 | 52.3 | 19 |
| Table Seven | 1800 | 1.0 | 1.0 | 50.2 | 21 |

1 Refers to sample shown in above Tables.

2 Ultraviolet light irradiation time for samples expressed in minutes.

3 Concentration of rearrangeable polymer in polyvinyl butyral expressed in parts per hundred parts of resin.

4 Thickness of irradiated sample in mils.

5 % T = % Transmission of ultraviolet light at wavelengths shown in above Tables.

6 % of rearrangeable polymer that has undergone rearrangement under the stated conditions.

Note that in the foregoing Table Eight the percent rearrangement varies from 8 to 100 percent. These values in Table Eight vary according to the sample exposure time, concentration of rearrangeable polymer initially present, and sample thickness. The 100 percent rearranged material represents a homopolymer of the orthohydroxybenzophenone structure represented by Formula IV above. Conversely, the unrearranged starting material is a rearrangeable homopolymer corresponding to the structure represented in Formula III above. The partially rearranged materials contain a reservoir of unrearranged polymer which is capable of undergoing rearrangement upon exposure to ultraviolet light.

It should be noted, that in order to obtain a polymeric material which comprises two superposed contiguous layers comprising (1) an outer exposed layer which is a rearranged polymer represented by the general structure of Formula IV above; and (2) an inner unexposed layer which is an unrearranged polymer of the type represented by Formula III above, the thickness of the unrearranged starting material should be at least 0.5 mils. This requirement will be readily apparent to those skilled in the art in view of the above discussion of the Beer-Lambert law.

From the data set forth above, it should be readily apparent to those skilled in the art that a wide variety of useful compositions may be prepared according to the teachings of the present invention. These compositions comprise a polymer comprising:

A.—From 1 to 99 mol % of the following recurring unit:

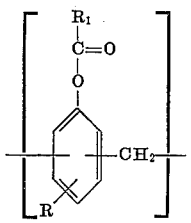

and

B.—From 99 to 1 mol % of the following recurring unit:

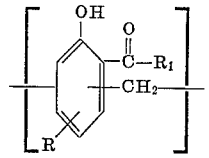

wherein R is selected from the group consisting of hydrogen, halogen and aliphatic radicals of from one to five carbon atoms and wherein $R_1$ is a monovalent radical containing at least one ring of six carbon atoms, said ring characterized by benzenoid unsaturation and attached directly to the carbonyl group.

The following examples 21–25 are set forth to further illustrate the superior ultraviolet light stability imparted by the polymeric stabilizers of this invention.

EXAMPLE 21

One part of the polymeric stabilizer prepared in Example 1 is milled into 100 parts of a standard poly(vinyl chloride) formulation and the composition is extruded into unpigmented, translucent 60 mil sheets of the type commonly used in exterior applications in building construction. This material, along with a control sample which contains no polymeric ultraviolet light stabilizers, is then exposed to ultraviolet light under accelerated conditions. After 100 hours, the control sample has deteriorated badly whereas the sample containing the polymeric stabilizer of Example 1 is relatively unchanged after 650 hours.

EXAMPLE 22

Example 21 is repeated here except that polystyrene is used in place of the polyvinyl chloride used in Example 21. One hundred parts of polystyrene is stabilized with 0.50 parts of the stabilizer prepared in Example 1, while a control sample is prepared with no stabilizer.

Upon exposure to ultraviolet light the control panel is badly discolored within 50 hours whereas the stabilized panel shows only slight change even after 200 hours.

Examples 21 to 22 are repeated using the polymeric stabilizers prepared in Examples 2 to 13. When using the stabilizers prepared in Examples 2 to 9, and 11 to 12, results comparable to those obtained in Examples 21 to 22 are obtained. However, when the esterification product of Example 13 is used, no ultraviolet light stabilization is achieved and little or no difference is observed between the control panel and that containing the additive. When using the esterification product of Example 10, some protection is achieved but not at the level provided by the stabilizers of Examples 1 to 9 and 11 to 12.

The polymeric light stabilizers of this invention may also be used in certain situations as protective coatings for various substrates as is illustrated by the following Examples 23–24.

EXAMPLE 23

One half of a white pigmented poly(vinyl chloride) panel is coated with a 15 percent methyl ethyl ketone solution of the polymeric ultraviolet light stabilizer prepared in Example 3. The solvent is evaporated depositing a 0.5 mil film on the panel which is then exposed to ultraviolet light. The unprotected, uncoated portion of the panel becomes dark after 24 hours whereas the coated protected portion shows no visual change in the substrate.

EXAMPLE 24

One half of a white pigmented poly(vinyl chloride) sheet is coated with a thin film of poly(vinyl butyral) containing 1.0 PHR of the polymeric light stabilizer prepared in Example 5. After 100 hours of irradiation the protected portion was virtually uneffected while the unprotected portion had turned dark within 24 hours.

EXAMPLE 25

This example illustrates the use of the polymeric light stabilizers of this invention as additives to film forming resins which are then coated onto a substrate to be protected.

Polyvinyl butyral resins containing the polymeric ultraviolet light stabilizers prepared in Examples 1-6 are coated onto polyvinyl chloride substrates to give a protective film about 0.5 mil thick. After 100 hours exposure to ultraviolet light the protected substrates show little or no change whereas the control samples show definite degradation after only 15 hours.

This invention contemplates using the polymeric ultraviolet stabilizers prepared therein as additives to materials to be protected, as films or coatings to be applied to substrates, or as additives to film forming materials which may by used per se or subsequently applied as films and coatings to protect various materials or substrates.

The materials that may be protected by the polymeric ultraviolet light stabilizers of this invention are wide and diverse. Indeed these stabilizers find use where ever protection from the adverse effects of ultraviolet light is desired. The polymeric ultraviolet light stabilizers of this invention may be used to protect thermoplastic polyvinyl plastics such as polyvinyl chloride, styrene, nethylmethacrylate and other related polymers. As is well known to those skilled in the art these materials find widespread use in exterior architectural applications such as sidings, rain gutters, awnings, etc., which are commonly used in building construction; in molded vehicle parts such as stop light lenses, dashboards, seat covers; in lawn and garden furniture, globes for navigation lights, etc.

The polymeric ultraviolet light stabilizers of this invention also find widespread use as additives to paints, varnishes, strip coatings, primers and other related coating materials. They may be used to protect textiles, fabrics, paperboard materials, metal and wood.

The amount of polymeric ultraviolet light stabilizer to be used in any given application will depend on such factors as (a) the degree of protection desired, (b) the type of application, e.g., use as an additive, as a coating, or as an additive to a coating, (c) the thickness of the protective coating (d) the incidence and intensity of the ultraviolet light to be expected in the given application, (e) the nature of the material to be protected, etc.

As indicated in Example 22 excellent protection is obtained using as little as 0.5 parts per hundred parts of resin of the polymeric stabilizers prepared in Examples 1 to 6 as an additive in polystyrene. Similarly, 1 mil film overlays containing polymeric stabilizers at levels as low as 0.5 parts per hundred parts of resins give comparably good protection to coated substrates. The upper limit on the amount of stabilizer used will vary with the intended application and the nature of the system. In the case where films of the polymeric stabilizers of this invention are used (Examples 23–24) excellent protection is achieved using films as thin as 0.5 mil.

In view of the foregoing it should be obvious that many variations are possible within the scope and practice of this invention without departing from the spirit and scope therein.

What is claimed is:

1. A material protected with a film of an ultraviolet light stabilizer wherein the protective film has a thickness of at least 0.5 mil and comprises two superposed contiguous layers comprising:

A. an outer exposed layer having the following recurring unit:

and

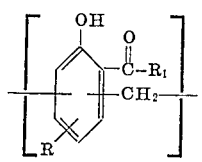

B. an inner layer having the following recurring unit:

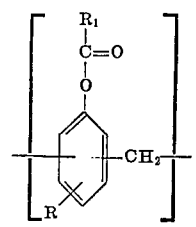

wherein R is selected from the group consisting of hydrogen, halogen and aliphatic radicals of from one to five carbons atoms: wherein $R_1$ is a monovalent radical containing at least one ring of six carbon atoms, said ring characterized by benzenoid unsaturation and attached directly to the carbonyl group; wherein at least 12.5 mol percent of the positions ortho to ester group in the inner layer are unsubstituted; and wherein the outer layer is the rearranged product of the inner layer.

2. The protected material of claim 1 wherein R is hydrogen.

3. The protected material of claim 1 wherein $R_1$ is a benzene radical.

4. The protected material of claim 1 wherein R is hydrogen and $R_1$ is a substituted benzene nucleus.

5. The protected material of claim 4 wherein the substituents on the benzene nucleus are selected from the group consisting of methyl, methoxy, nitro, chlorine, phenyl and diphenyl.

6. A material protected with a film of an ultraviolet light stabilizer wherein the protective film has a thickness of at least 0.5 mil and comprises two superposed contiguous layers comprising:

A. an outer exposed layer having the following recurring unit:

and

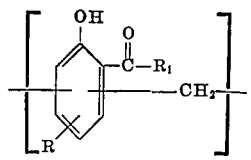

B. an inner layer having the following recurring unit:

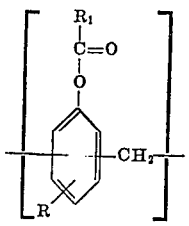

wherein R is hydrogen; wherein $R_1$ is a monovalent benzene radical; wherein at least 12.5 mol percent of the positions ortho to ester group in the inner layer are unsubstituted; and wherein the outer layer is the rearranged product of the inner layer.

* * * * *

UNITED STATES PATENT OFFICE
CERTIFICATE OF CORRECTION

Patent No. 3,650,799                     Dated  March 21, 1972

Inventor(s) Raymond H. Young, Jr., Albert H. Markhart & Joseph G. Martins

It is certified that error appears in the above-identified patent and that said Letters Patent are hereby corrected as shown below:

Column 2, Formula III should read ---

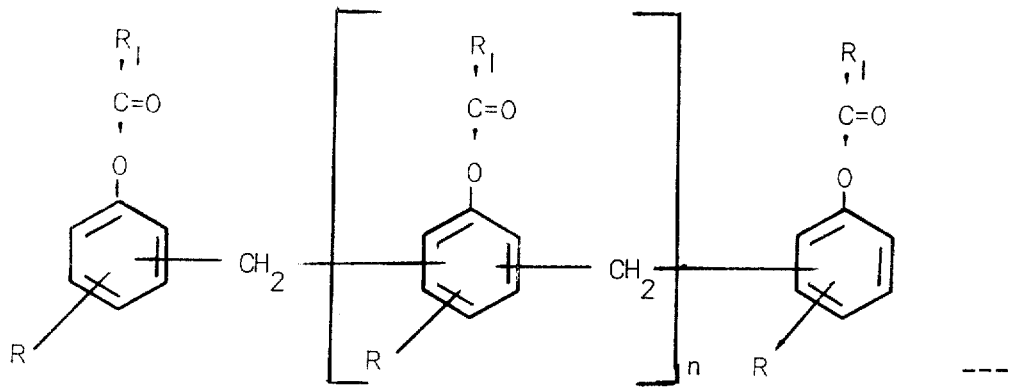

Formula (III) - Rearrangeable polymer

Column 3, line 26, after "re" add --- present ---.

Signed and sealed this 3rd day of October 1972.

(SEAL)
Attest:

EDWARD M. FLETCHER, JR.            ROBERT GOTTSCHALK
Attesting Officer                  Commissioner of Patents